United States Patent
Rada et al.

(10) Patent No.: US 6,847,330 B2
(45) Date of Patent: Jan. 25, 2005

(54) DETACHABLE 802.11A ANTENNA DETECTION

(75) Inventors: Patrick Rada, San Jose, CA (US); Mark Merrill, Atherton, CA (US)

(73) Assignee: Netgear Inc., Santa Clara, CA (US)

( * ) Notice: Subject to any disclaimer, the term of this patent is extended or adjusted under 35 U.S.C. 154(b) by 5 days.

(21) Appl. No.: 10/606,949

(22) Filed: Jun. 23, 2003

(65) Prior Publication Data

US 2004/0257284 A1 Dec. 23, 2004

(51) Int. Cl.[7] .............................................. H01Q 1/24
(52) U.S. Cl. ....................... 343/702; 370/310; 455/3.01
(58) Field of Search ................................. 343/702, 718; 342/159, 162; 370/282, 310, 320, 395.3; 455/3.01

(56) References Cited

U.S. PATENT DOCUMENTS

| | | | |
|---|---|---|---|
| 6,526,264 B2 | * | 2/2003 | Sugar et al. ................... 455/84 |
| 6,697,013 B2 | * | 2/2004 | McFarland et al. ......... 342/159 |
| 2002/0176390 A1 | * | 11/2002 | Sparr et al. .................. 370/338 |

* cited by examiner

*Primary Examiner*—Don Wong
*Assistant Examiner*—Jimmy Vu
(74) *Attorney, Agent, or Firm*—Wilson Sonsini Goodrich & Rosati (57) ABSTRACT

Disclosed is a wireless node with a detachable antenna. When the antenna is detached, 802.11a lower band communications are disabled. When the antenna is attached, 802.11a lower band communications are enabled.

66 Claims, 10 Drawing Sheets

DETACHABLE 802.11A ANTENNA DETECTION

BACKGROUND OF THE INVENTION

The 802.11a physical layer may support wireless communication at rates of up to 54 Mbps in the 5 GHz band. The 802.11a 5 GHz band is divided into a lower band of 5.15–5.25 GHz, a middle band of 5.25–5.35 GHz, and an upper band of 5.725–5.825 GHz. Operating in any of the channels of the lower band can be considered operating in the lower band of 5.15–5.25 GHz. A dual band antenna refers generally to the 2.4 GHz band and the lower and middle 802.11a bands. A triband antenna refers generally to the 2.4 GHz band and all 802.11a bands.

Advantageous flexibility would be provided by a wireless node having an external, detachable antenna for 802.11a. For example, the antenna could be relocated in a better location. Various antennas could be used with the wireless node, such as an omnidirectional antenna or a directional antenna. Additionally, electronics could be separated from antenna.

However, government regulations can require that 802.11a lower band communications occur via an integral antenna. In particular, the Federal Communications Commission provides in Title 47 of the Code of Federal Regulations, section 15.407, that any unlicensed National Information Infrastructure device that operates in the 5.15–5.25 GHz band shall use a transmitting antenna that is an integral part of the device.

Thus, it would be desirable if a wireless node could have a detachable antenna and still comply with government rules on 802.11a lower band communications.

BRIEF SUMMARY OF THE INVENTION

Some embodiments of a wireless node include detachable antenna and a base unit. The detachable antenna includes an antenna element and an antenna identifier. The antenna element is of at least an 802.11a lower band. The antenna identifier identifies the detachable antenna including the antenna element of at least the 802.11a lower band. The base unit is coupleable to the detachable antenna. The base unit includes an antenna detector and 802.11a circuitry. The antenna detector detects the antenna identifier. The 802.11a circuitry includes at least 802.11a lower band circuitry. The base unit has a first mode and a second mode. The first mode enables 802.11a lower band communications of the wireless node. The second mode disables 802.11a lower band communications of the wireless node. The mode of the base unit depends on if the antenna detector detects or fails to detect the antenna identifier.

DETAILED DESCRIPTION OF THE INVENTION

Figure 1:
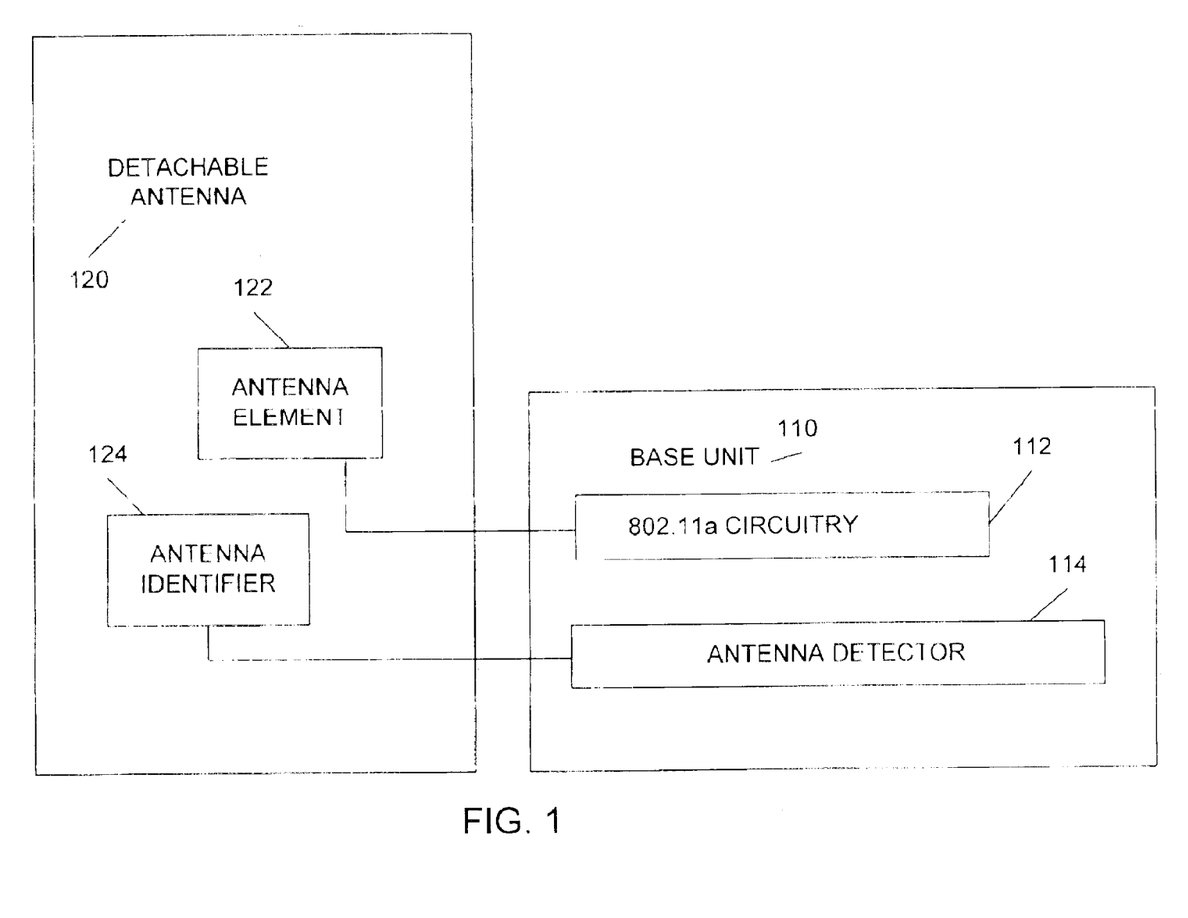
FIG. 1 shows an embodiment of a wireless node.

FIG. 1 shows one embodiment of a wireless node. The wireless node may be a bridge, an access point, a router, a gateway, a modem, and/or a client adapter. Some examples of a client adapter are a PC card, a USB device, a PCI card, and/or a mini-PCI card.

A base unit 110 can be coupled to a detachable antenna 120. Some embodiments couple the base unit 110 to a single antenna. Other embodiments couple the base unit 10 to multiple antennas, for example to provide spatial diversity. In some cases the detachable antenna 120 is a dipole antenna.

The base unit 110 includes 802.11a circuitry 112 and an antenna detector 114. The base unit 110 may include other circuitry as well, such as 802.11b circuitry, 802.11g circuitry, Bluetooth circuitry, GPRS circuitry, UWB circuitry, and/or other circuitry. The 802.11a circuitry 112 and the antenna detector 114 may be discrete or integrated together.

The detachable antenna 120 includes an antenna element 122 and an antenna identifier 124. The antenna element 122 radiates and/or receives in at least an 802.11a lower band. The antenna element 122 may also operate in other frequencies. Some embodiments of the detachable antenna include multiple antenna elements, such as for transmitting and/or receiving in various frequency bands; at least one of these multiple antenna elements can radiate and/or receive in at least the 802.11a lower band.

The detachable antenna can include a whip antenna, such as a dipole, monopole, PCB with one or several antenna elements, and/or patch antenna. The detachable antenna can be packaged in an enclosure, which may be plastic.

The antenna identifier 124 identifies the detachable antenna 120. This identification confirms that the antenna which houses or includes the antenna identifier also houses or includes the antenna element 122. In particular, depending on whether the antenna identifier 124 is detected by the antenna detector 114, the base unit 110 enters a first mode enabling 802.11a lower band communications or a second mode disabling 802.11a lower band communications.

Figure 2:
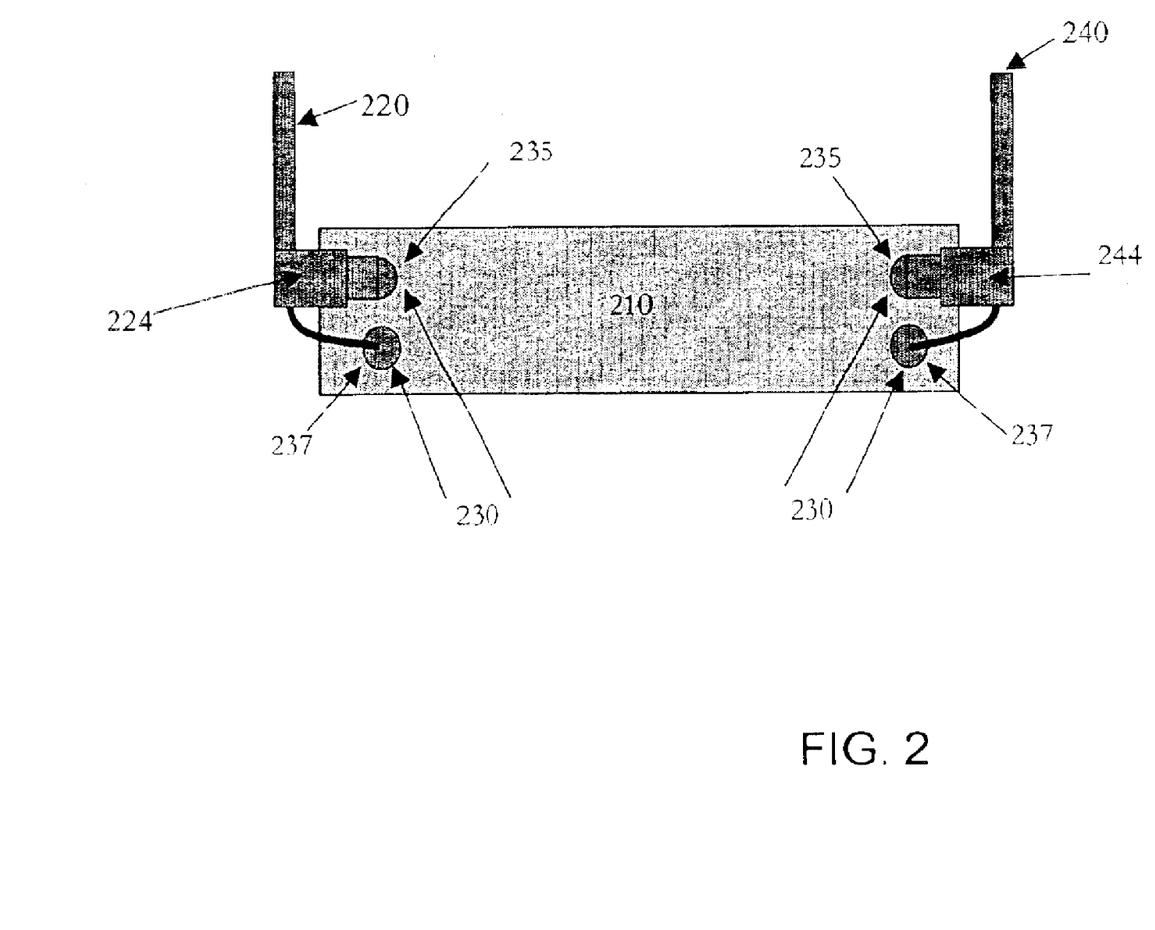
FIG. 2 shows an example of a wireless node enabled for 802.11a lower band communications.

FIG. 2 shows a specific example of a wireless node. The wireless node includes a base unit 210 and detachable antennas 220 and 240. Detachable antennas 220 and 240 may be, for example, triband 802.11a/b/g antennas. Detachable antennas 220 and 240 respectively include antenna identifiers 224 and 244. Different antenna elements in the detachable antenna can couple to the base unit via different connectors. Detachable antennas 220 and 240 connect their respective 802.11a antenna elements via 802.11a connectors 235. Detachable antennas 220 and 240 connect their respective 802.11g/b antenna elements via 802.11g/b connectors 237. These connectors can be, for example, reverse RF connectors 230. In the wireless node of FIG. 2, the antenna identifiers 224 and 244 are detected by one or more antenna detectors in the base unit 210, enabling 802.11a lower band communications.

Figure 3:
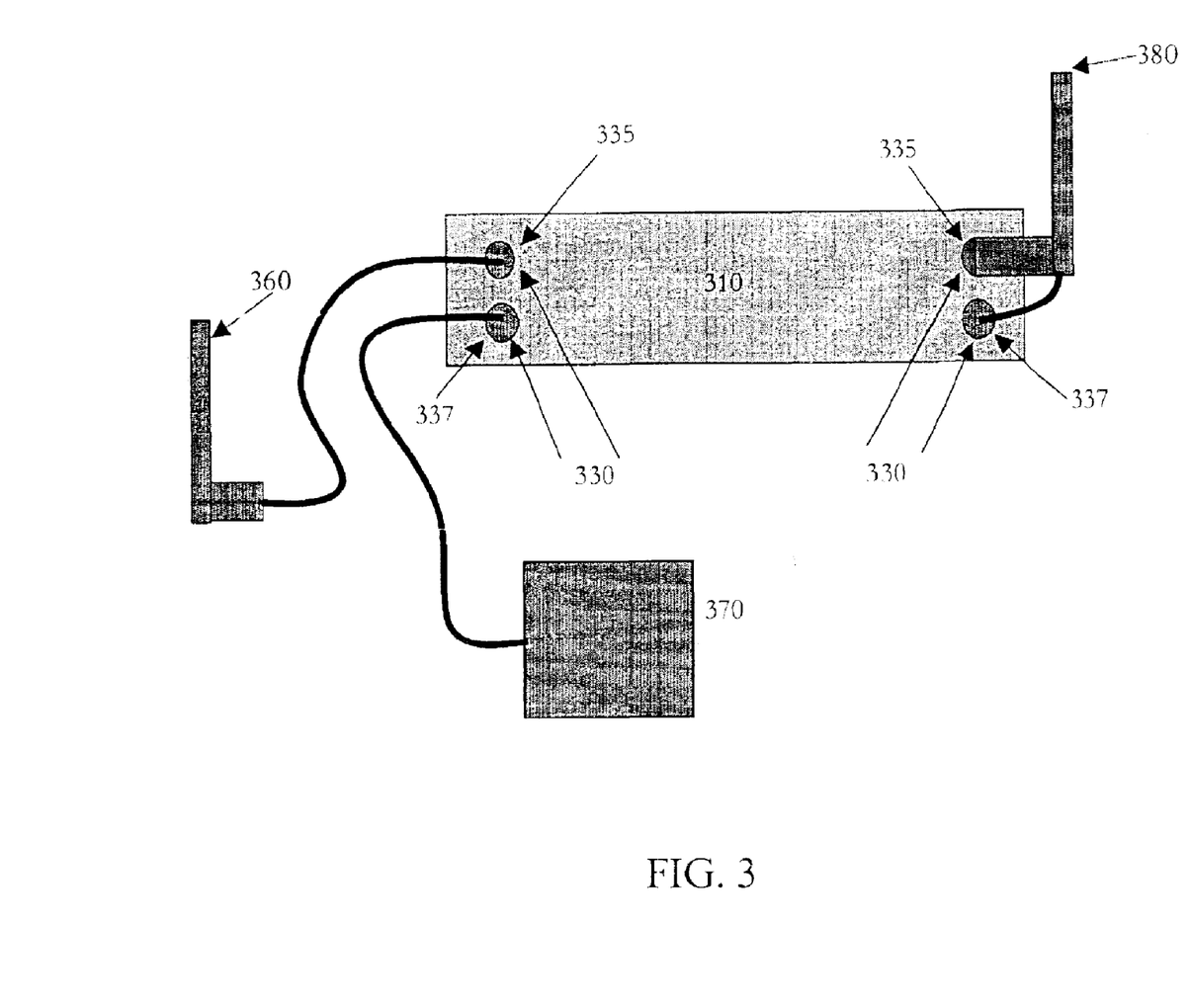
FIG. 3 shows an example of a wireless node disabled for 802.11a lower band communications.

FIG. 3 shows another specific example of a wireless node. The wireless node includes abase unit 310 and detachable antennas 360, 370, and 380. Detachable antenna 360 can, for example, be a dual band 802.11a antenna. Detachable antenna 370 can, for example, be an 802.11b/g antenna. Detachable antenna 380 can, for example, be a triband 802.11a/g antenna. Detachable antennas 360, 370, and 380 all lack an antenna identifier. Detachable antennas 360 and 380 connect their respective 802.11a antenna elements via 802.11a connectors 335. Detachable antennas 370 and 380 connect their respective 802.11g/b antenna elements via 802.11g/b connectors 337. These connectors can be, for example, reverse RF connectors 330. In the wireless node of FIG. 3, no antenna identifiers are detected by one or more antenna detectors in the base unit 310, disabling 802.11a lower band communications.

Figure 4:
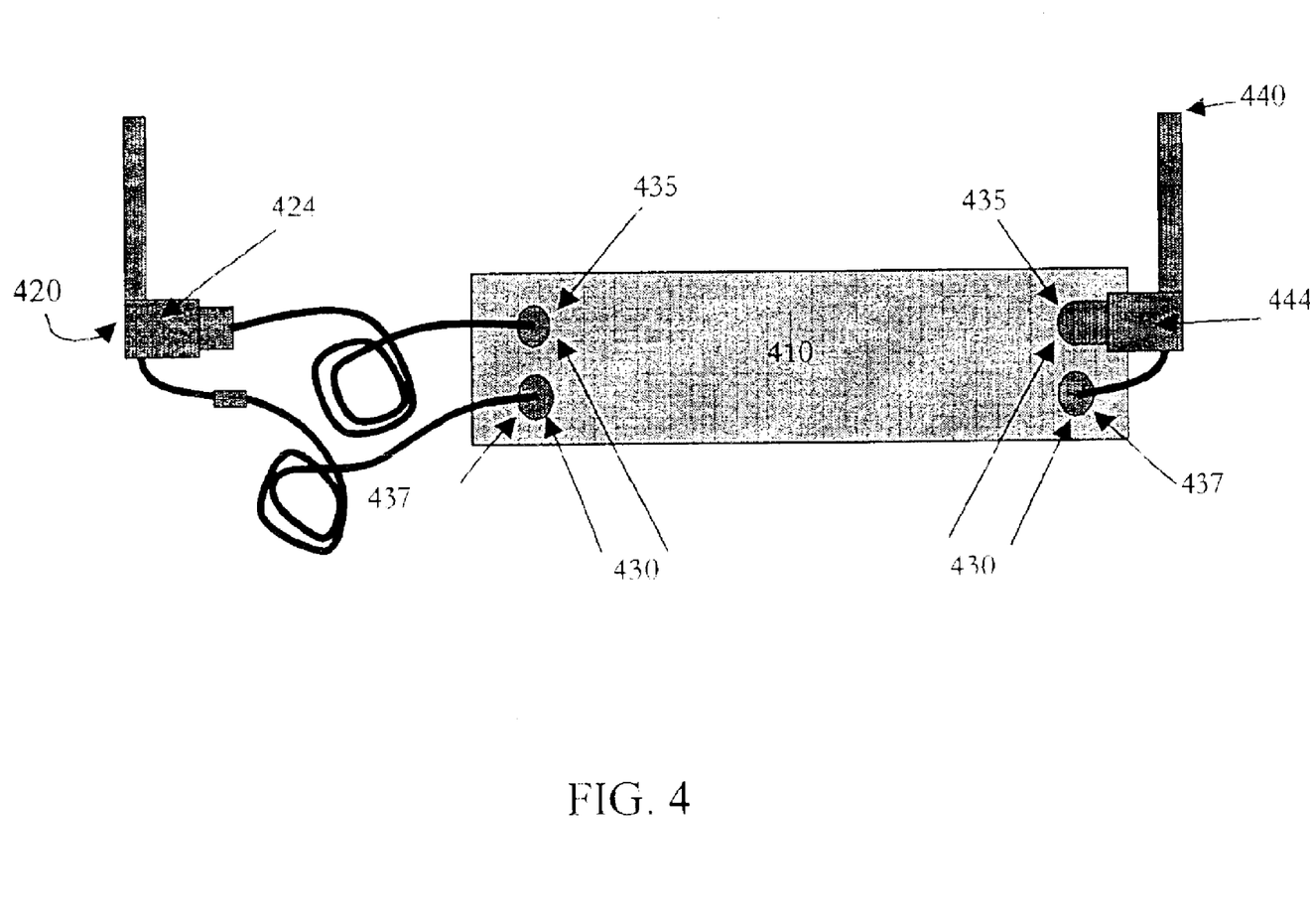
FIG. 4 shows an example of another wireless node enabled for 802.11a lower band communications. An antenna is remotely connected.

FIG. 4 shows a specific example of a wireless node similar to the wireless node of FIG. 2. However, rather than being directly coupled to the base unit 410, detachable antenna 420 is remotely coupled to the base unit 410 via cables.

Figure 7:
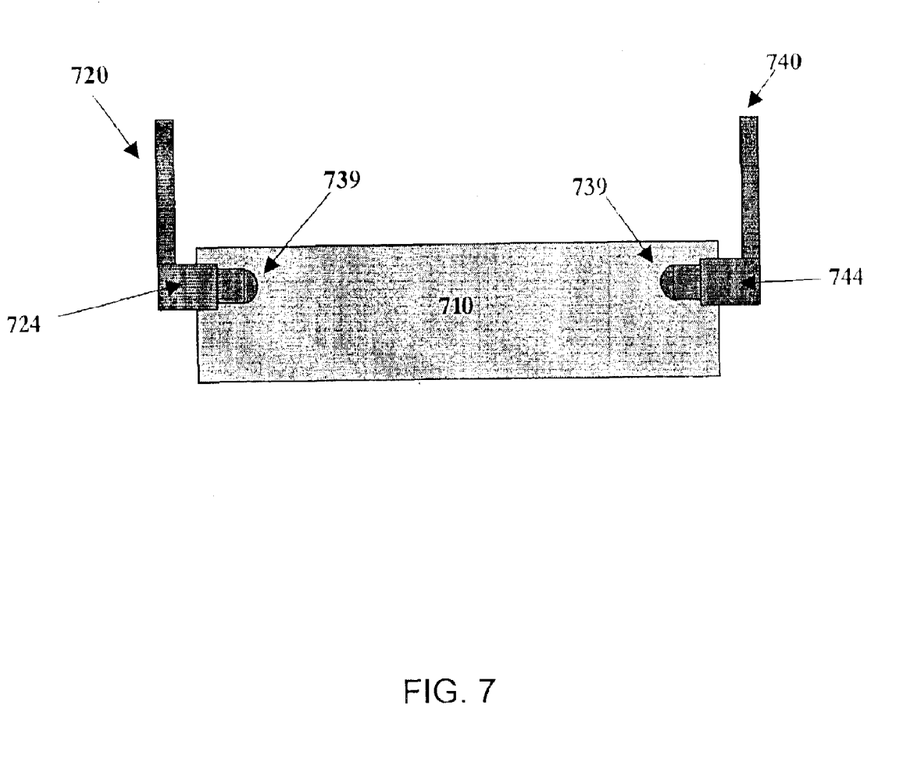
FIG. 7 shows an example of a wireless node enabled for 802.11a lower band communications. The antenna includes an antenna identifier and a single connector for 802.11communmunications.

FIG. 7 shows a specific example of a wireless node similar to the wireless node of FIG. 2. However, rather than using multiple connectors, for instance one for 11a communications and another for 11b/g communications, one connector 739 per antenna is used. The connector can be a custom connector with one or more conductors, or a standard coaxial connector, or a reverse coaxial connector, etc. One implementation has the antenna element and antenna identifier signals communicated on one conductor. In the wireless node of FIG. 7, the antenna identifiers 724 and 744 are detected by one or more antenna detectors in the base unit 710, enabling 802.11a lower band communications.

Figure 8:
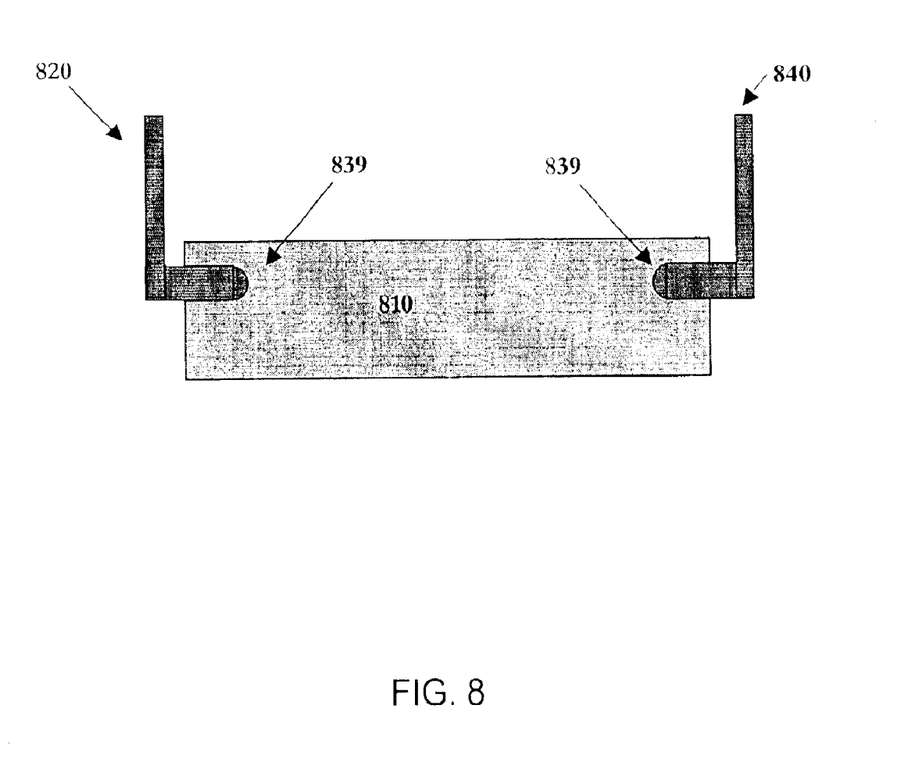
FIG. 8 shows an example of a wireless node disabled for 802.11 a lower band communications. The antenna does not include an antenna identifier and uses a single connector for 802.11 communications.

FIG. 8 shows a specific example of a wireless node similar to the wireless node of FIG. 7. However, no antenna identifiers are detected by one or more antenna detectors in the base unit 810, disabling 802.11a lower band communications.

Figure 9:
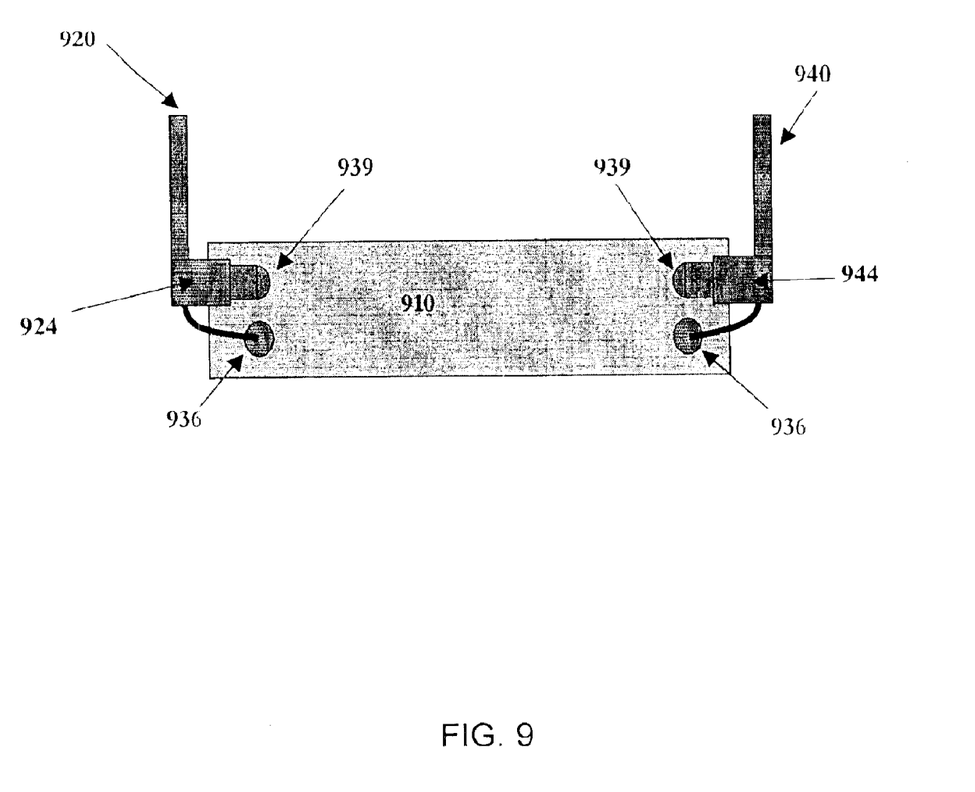
FIG. 9 shows an example of a wireless node enabled for 802.11a lower band communications. The antenna includes an antenna identifier and separate connectors for 802.11 communications and for antenna identifier communications.

FIG. 9 shows an example of a wireless node enabled for 802.11a lower band communications. The antennas 920 and 940 each have a separate connector for the antenna identifier signal 936 and a separate connector for 802.11 communications 939. The connectors for 802.11 communications 939 can be a reverse coaxial connector, and the connectors for the antenna identifier signal 936 can be any kind of connector.

Some embodiments of the wireless node can provide 802.11a and 802.11g/b at the same time and/or different times.

In some embodiments, a time period between a first attempt and a second attempt for the antenna identifier to be detected by the antenna detector can be a cyclic interval, a random interval, a pseudorandom interval, and/or a deterministic interval.

Different embodiments have various types of antenna detectors that detect various types of antenna identifiers. For example, detection can occur passively, actively, mechanically, wirelessly, optoelectronically and/or electronically.

The antenna detection can be done with analog electronics. One example is the base unit generating a current flowing into a resistor of the antenna detector, which is detected by the antenna detector. Another example is an electronic signal generated by the base unit, amplified by the antenna identifier, and detected by the antenna detector.

The antenna detection can be done by digital electronics. One example is the base unit generating a digital signal sent to the antenna identifier and sent back to the antenna detector, modified or not modified.

In one embodiment, the antenna identifier includes a switch activator, the antenna detector includes a switch, and the antenna detector detects the antenna identifier when the switch activator activates the switch.

In another embodiment, the antenna identifier includes a tag, the antenna detector includes a tag detector, and the antenna detector detects the antenna identifier when the tag detector detects the tag, such as when they are in proximity. The tag can be active and/or passive. The tag can be wireless and/or wired. An example of an antenna identifier wireless tag is a nonlinear circuit, which generates harmonics of the frequency applied by a magnetic loop part of the base unit in close proximity. The harmonic frequency is detected by the antenna detector.

In yet another embodiment, the antenna identifier includes a load, the antenna detector includes a load detector, and the antenna detector detects the antenna identifier when the load detector detects the load. The load can be any combination of resistance, capacitance, inductance, and/or an active load. Examples of passive loads are: resistance, inductance, capacitor, diode, transformer, filter, etc. With an active load, signals sent to the antenna identifier can be modified in amplitude and/or frequency. Other circuits can be activated by the active load. Example of active loads are: transistor, analog integrated circuit, digital integrated circuit, mixed mode integrated circuit, etc.

In a further embodiment, the antenna identifier includes a digital device, the antenna detector includes a digital detector, and the antenna detector detects the antenna identifier when the digital detector detects an acceptable signal from the digital device. The digital device can be a microprocessor, a state machine, a FPGA, an ASIC and/or a SAW filter, etc. The antenna detector and the antenna identifier can have one-way and/or hi-directional communication during the detection process and/or afterwards.

In some implementations the antenna detector can initiate the detection process. In other implementations, the antenna identifier can initiate the detection process. In some other cases, the antenna detector and/or the antenna identifier can initiate the detection process. Starting the identification process can be triggered by an external event and/or by an internal event. An example of external event is: when the detachable antenna is plugged into the base unit, a current from the base is drawn by the antenna identifier, which is detected by the antenna detector. An example of an internal event is: a timer within the antenna detector generates a trigger signal, which initiates the detection process. The trigger signal can be single-shot, repetitive, or repetitive for a limited number of occurrences.

One specific embodiment employs analog detection of a DC voltage. Separate waveguides are used for the detection signal and the actual RF signal. The antenna connector has a 50 ohm RF connector, a separate detection pin, and a grounding bracket. The antenna identifier, a resistor (e.g. 1 kohm), is connected from detection pin to ground in the antenna. An external bracket protects the RF connector and the detection pin. A notch guides the detection pin to mating connector of the base unit. When the antenna is connected to the base unit, a DC current (e.g. 1 mA) flows from the base unit to the detection pin, creating a voltage across the resistor determined by the values of the current and the resistance, e.g. 1V. An ADC internal to the antenna detector reads the voltage. If the voltage is R×I+/−tolerance (e.g. 1V+/−100 mV), the antenna identifier is detected. If the detection pin is open, short, or not at the expected potential, the antenna identifier is not detected.

The waveguides for the detection signal and the RF signal may be combined. The RF part of the base unit can be AC coupled to suppress the DC voltage. The ADC and current source can be RF filtered, such that DC voltage passes and the AC signal is suppressed. The value of the antenna's resistor can be much bigger than 50 ohms, e.g. 5 kohm, so that the RF impedance is not detuned. A connector such as a standard reverse RF connector can be used.

Another specific embodiment employs analog detection of an AC voltage and a DC voltage, along with a time limited detection process. This embodiment increases the level of security in the detection process. Connecting the antenna to the base unit causes a current source inside the base unit to generate a DC voltage across the antenna's resistor. The DC voltage is detected by the base unit. The base unit generates a time limited AC signal (e.g. 10 MHz) that creates an AC voltage across the antenna's AC network (e.g., an impedance and/or active load) the antenna identifier. The antenna detector detects this AC voltage. Successful detection of the antenna identifier happens when the AC voltage read by the antenna detector is between VACmin and VACmax. The detection process takes a limited period of time (e.g. 1 second or less), which decreases interference with the actual RF signals, and raises the difficulty of detecting and reverse engineering the proper values for VACmin and VACmax.

Further AC detection is optional until the DC voltage is lost, for example if the detachable antenna is decoupled from the base unit, or the base unit is powered off. The detection process can be performed each time a change in the DC voltage is detected and/or each time the access point is switched on. Detection of the antenna identifier fails for any antenna without the correct AC network, thereby disabling 802.11a lower band communications.

One wire or multiple wires can connect the detachable antenna and the base unit. The DC voltage and AC detection signal can be carried on one or multiple waveguides. The RF signal can be carried on a shared waveguide or another waveguide.

A further specific embodiment employs digital communication between a digital device in the antenna and the base unit.

When the antenna is coupled to the base unit, a current source inside the base unit generates a DC voltage across a resistor (load) in the antenna. This DC voltage is detected by the base unit, and supplies power to the antenna's digital chip. Digital communication takes place between the antenna and the base unit for a limited time (e.g. 1 second or less). Information, such as whether the antenna should be recognized by the base unit as an acceptable 802.11a lower band antenna, and/or valid maximum gain of antenna can be exchanged with the base unit. Consequently, the antenna detector of the base unit detects or fails to detect the antenna identifier of the detachable antenna. Authentication and/or encryption can be performed. Further digital communication may not occur until the DC voltage is lost, for example, when the detachable antenna is decoupled from the base unit, or the base unit is powered off. The detection process can restart each time a change in the DC voltage is detected, and/or each time the base unit is powered on.

Another embodiment of the detection process can use repetitive polling. This method can provide more security.

In another embodiment, the load can be active. The load can be a digital circuit (antenna identifier) which draws current to power itself. This current flowing into the antenna identifier can be detected by the antenna detector.

One wire or multiple wires can connect the detachable antenna and the base unit. The DC voltage and AC detection signal can be carried on one or multiple waveguides. The RF signal can be carried on a shared waveguide or another waveguide.

Figure 5:
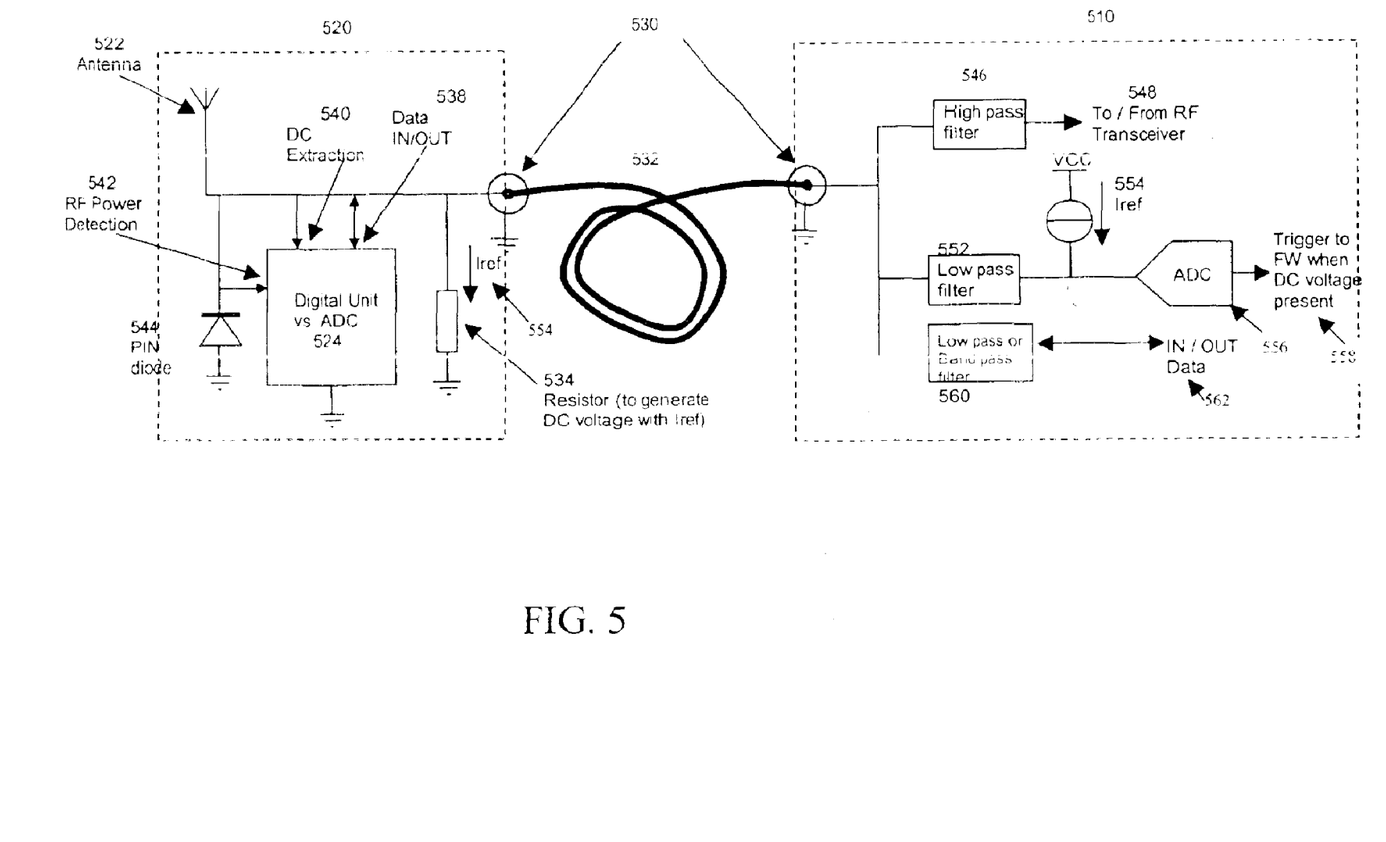
FIG. 5 shows an example of antenna detection via digital communication.

FIG. 5 shows an embodiment with this particular type of detection. An antenna 520 is connected via an RF cable 532 to a portion of a base unit 510. The RF cable 532 connects to standard, reverse coaxial, or custom connectors 530. The RF cable is optional; the antenna 520 may also be directly coupled to the base unit. In the portion of the base unit 510, the coaxial connector 530 is connected to high pass filter 546 and low pass filter 552, and band pass or low pass filter 560. High pass filter 546 filters communication with the RF transceiver 548. Low pass filter 552 is connected to current source Iref 554, which helps to supply power to the antenna. ADC 556 sends the trigger to the firmware of the base unit when a DC voltage is present at the antenna 520. Band pass filter 560 communicates data 562. In the antenna 520, the coaxial connector 530 is connected to the resistor 534 (load), which generates a DC voltage with Iref 554. A digital chip 524 acts as the antenna identifier, and is connected via data in/out 538, DC extraction 540, and optional RF power detection 542. The antenna 520 further includes an antenna element 522 and optional power detection diode 544.

In some embodiments, if the detected power is too high, the lower 802.11a band can be disabled.

Figure 10:
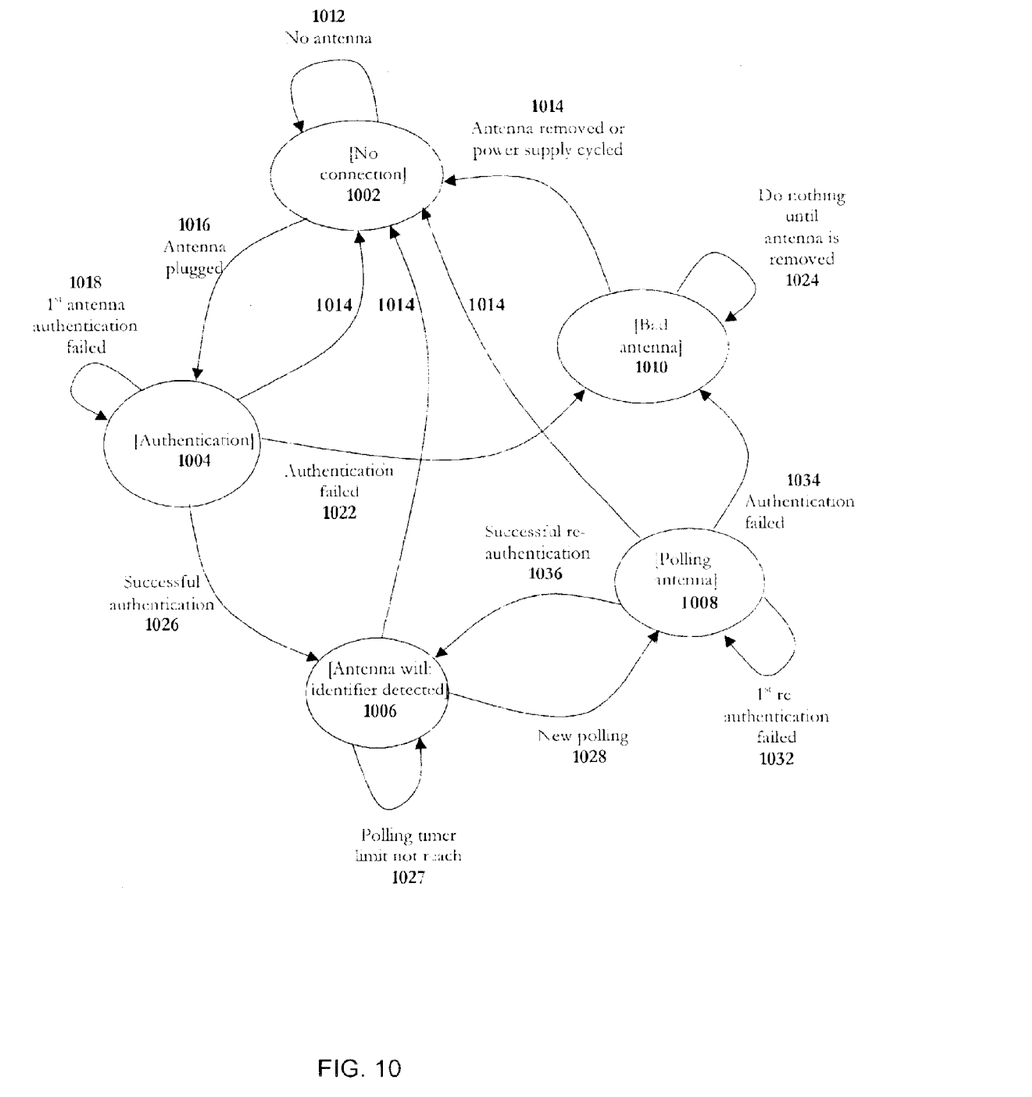
FIG. 10 shows an example implementation of an antenna detection state diagram.

FIG. 10 shows an example implementation of an antenna detection state diagram. The following states can be defined: [no connection] 1002, [authentication] 1004, [antenna with identifier detected] 1006, [polling antenna] 1008, and [bad antenna] 1010. When no antenna is attached 1012; the antenna detector software is in the [no connection] state 1002. Also at any time, if the antenna is removed 1014, the software jumps to [no connection] 1002. Furthermore, at any time, if the power supply of the antenna detector cycles or changes more than a permitted range, 1014, the software jumps to [no connection] 1002. If the antenna is plugged 1016, it jumps to [authentication state] 1004. If authentication fails a first time there is a retry 1018. If authentication fails a $2^{nd}$ time 1022, the software jumps to [bad antenna] state 1010 and stays in this state until the antenna is removed 1024. If authentication succeeds 1026, the software jumps to [antenna with identifier detected] state 1006. If the polling timer limit is not reached 1027, the software remains in the [antenna with identifier detected] state 1006. Each time the polling timer limit is reached 1028, software jumps to [polling antenna] state 1008. If authentication fails a first time there is a retry 1032. If authentication fails a $2^{nd}$ time 1034, the software jumps to [bad antenna] state 1010 and stays in this state until the antenna is removed 1024. If authentication succeeds 1036, the software jumps to [antenna with identifier detected] state 1006.

In some embodiments, polling is repetitive but limited to a fixed number of occurrences.

In some embodiments, polling can be removed. In this case [polling antenna] state and links to/from it are removed.

Figure 6:
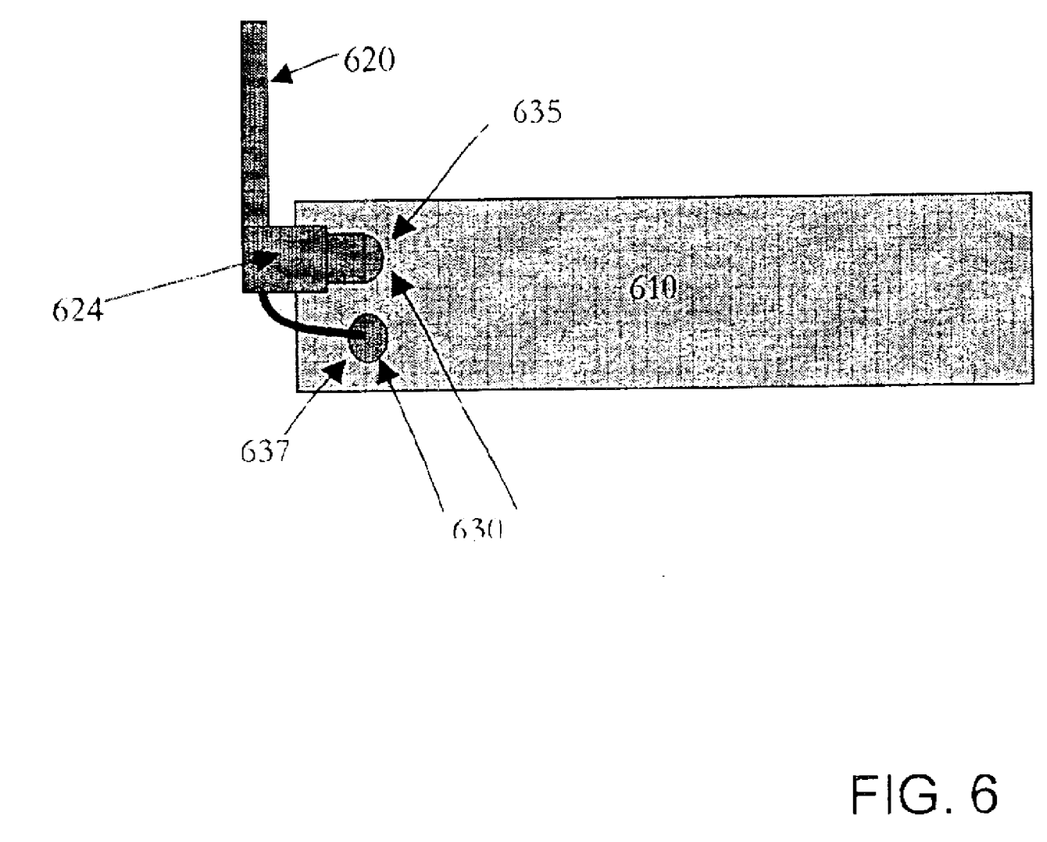
FIG. 6 shows an example of antenna without spatial diversity.

FIG. 6 shows another specific example of a wireless node without spatial diversity. The wireless node includes a base unit 610 and a detachable antenna 620. Detachable antenna 620 may be, for example, a triband 802.11a/g antenna. Detachable antenna 620 includes antenna identifier 624. Different antenna elements in the detachable antenna can couple to the base unit via different connectors. Detachable antenna 620 connects its 802.11a antenna element via 802.11a connector 635. Detachable antennas 620 connects its 802.11g/b antenna element via 802.11g/b connector 637. These connectors can be, for example, a reverse RF connector 630. In the wireless node of FIG. 6, the antenna identifier 624 is detected by one or more antenna detectors in the base unit 610, enabling 802.11a lower band communications.

What is claimed is:

1. A wireless node, comprising:
   a detachable antenna including:
      an antenna element of at least an 802.11a lower band, and
      an antenna identifier that identifies the detachable antenna including the antenna element of at least the 802.11a lower band, and
   a base unit coupleable to the detachable antenna, including:
      an antenna detector that detects the antenna identifier,
      802.11a circuitry including at least 802.11a lower band circuitry,
      a first mode enabling 802.11a lower band communications of the wireless node if the antenna detector detects the antenna identifier, and
      a second mode disabling 802.11a lower band communications of the wireless node if the antenna detector fails to detect the antenna identifier.

2. The node of claim 1, wherein the antenna identifier includes at least one passive component.

3. The node of claim 1, wherein the antenna identifier includes at least one active component.

4. The node of claim 1, wherein the antenna identifier includes at least one mechanical component.

5. The node of claim 1, wherein the antenna identifier includes at least one optoelectronic component.

6. The node of claim 1, wherein the antenna detector detects the antenna identifier at least electronically.

7. The node of claim 1, wherein the antenna identifier includes a switch activator, the antenna detector includes a switch, and the antenna detector detects the antenna identifier when the switch activator activates the switch.

8. The node of claim 1, wherein the antenna identifier includes a tag, the antenna detector includes a tag detector, and the antenna detector detects the antenna identifier when the tag detector detects an acceptable value from the tag.

9. The node of claim 1, wherein the antenna detection is done at least by analog electronics.

10. The node of claim 1, wherein the antenna detection is done at least by digital electronics.

11. The node of claim 1, wherein the antenna detection is done at least mechanically.

12. The node of claim 1, wherein the antenna detection is done at least optoelectronically.

13. The node of claim 1, wherein the antenna identifier and the antenna detector communicate electronically, and an identification electronic signal communicated by the antenna identifier is modulated in frequency.

14. The node of claim 1, wherein the antenna identifier and the antenna detector communicate electronically, and an identification electronic signal communicated by the antenna identifier is modulated in time.

15. The node of claim 1, wherein the antenna identifier and the antenna detector communicate electronically, and an identification electronic signal communicated by the antenna identifier is modulated in pulse width.

16. The node of claim 1, wherein the antenna identifier and the antenna detector communicate electronically, and an identification electronic signal communicated by the antenna identifier is modulated in code (CDMA).

17. The node of claim 1, wherein the antenna identifier includes a load, the antenna detector includes a load detector, and the antenna detector detects the antenna identifier when the load detector detects an acceptable value from the load.

18. The node of claim 17, the load is at least partly passive.

19. The node of claim 17, the load is at least partly active.

20. The node of claim 1, wherein the antenna identifier includes a digital device, the antenna detector includes a digital detector, and the antenna detector detects the antenna identifier when the digital detector detects an acceptable signal from the digital device.

21. The node of claim 20, wherein the antenna detector detects the antenna identifier via bi-directional communication between the antenna identifier and the antenna detector.

22. The node of claim 20, wherein the antenna detector detects the antenna identifier via one way communication from the antenna identifier to the antenna detector.

23. The node of claim 20, wherein the digital information of the acceptable signal is at least partly encrypted.

24. The node of claim 20, wherein the digital information of the acceptable signal is at least partly unencrypted.

25. The node of claim 20, wherein an external event triggers at least one of the antenna detector detecting the antenna identifier and the antenna detector failing to detect the antenna identifier.

26. The node of claim 20, wherein an internal event triggers at least one of: the antenna detector detecting the antenna identifier and the antenna detector failing to detect the antenna identifier.

27. The node of claim 20, wherein a single-shot trigger signal triggers at least one of: the antenna detector detecting the antenna identifier and the antenna detector failing to detect the antenna identifier.

28. The node of claim 20, wherein a repetitive trigger signal triggers at least one of: the antenna detector detecting the antenna identifier and the antenna detector failing to detect the antenna identifier.

29. The node of claim 28, wherein the repetitive trigger signal is repetitive for a limited number of occurrences.

30. The node of claim 1, wherein the wireless node includes an access point.

31. The node of claim 1, wherein the wireless node includes a router.

32. The node of claim 1, wherein the wireless node includes a gateway.

33. The node of claim 1, wherein the wireless node includes a modem.

34. The node of claim 1, wherein the wireless node includes a client adapter.

35. The node of claim 1, wherein the wireless node includes a bridge.

36. The node of claim 1, wherein the detachable antenna is directly coupled to the base unit.

37. The node of claim 36, wherein the detachable antenna is directly coupled to the base unit via a coaxial connector.

38. The node of claim 36, wherein the detachable antenna is directly coupled to the base unit via at least one conductor in one connector.

39. The node of claim 36, wherein the detachable antenna is directly coupled to the base unit via at least one conductor in more than one connector.

40. The node of claim 36, wherein the detachable antenna is directly coupled to the base unit via one PCB connector with at least one conductor.

41. The node of claim 1, wherein the detachable antenna includes a whip antenna.

42. The node of claim 1, wherein the detachable antenna includes a PCB antenna.

43. The node of claim 1, wherein the detachable antenna includes a patch antenna.

44. The node of claim 1, wherein the detachable antenna is remotely coupled to the base unit.

45. The node of claim 44, wherein the detachable antenna is remotely coupled to the base unit via a cable.

46. The node of claim 45, wherein the cable has a coaxial connector.

47. The node of claim 1, wherein the base unit is coupled to an antenna missing the antenna identifier.

48. The node of claim 47, wherein base unit is in the second mode.

49. The node of claim 1, wherein the base unit is coupled to the detachable antenna.

50. The node of claim 49, wherein base unit is in the first mode.

51. The node of claim 1, wherein powering off the base unit causes the base unit to enter the second mode.

52. The node of claim 1, wherein decoupling the detachable antenna from the base unit causes the base unit to enter the second mode.

53. The node of claim 1, wherein the detachable antenna is remotely powered.

54. The node of claim 53, wherein the detachable antenna is remotely powered from the base unit.

55. The node of claim 1, wherein the detachable antenna includes a dipole antenna.

56. The node of claim 1, wherein a time period between a first attempt and a second attempt for the antenna identifier to be detected by the antenna detector is a cyclic interval.

57. The node of claim 1, wherein a time period between a first attempt and a second attempt for the antenna identifier to be detected by the antenna detector is a random interval.

58. The node of claim 1, wherein a time period between a first attempt and a second attempt for the antenna identifier to be detected by the antenna detector is a pseudorandom interval.

59. The node of claim 1, wherein a time period between a first attempt and a second attempt for the antenna identifier to be detected by the antenna detector is a deterministic interval.

60. The node of claim 1, further comprising an antenna detection algorithm following a state diagram with at least the following states: no connection state, authentication state, antenna with identifier detected state, polling antenna state, and bad antenna state.

61. The node of claim 60, wherein the polling antenna state is repetitive.

62. The node of claim 61, wherein the polling antenna state is repetitive and limited to a fixed number of occurrences.

63. The node of claim 60, wherein the polling antenna state has a single occurrence.

64. The node of claim 60, wherein the state machine permits the polling antenna state to be disabled.

65. The node of claim 1, further comprising an antenna detection algorithm following a state diagram with at least the following states: no connection state, authentication state, antenna with identifier detected state, and bad antenna state.

66. The node of claim 1, wherein 802.11a lower band communications of the wireless node are disabled if power in the detachable antenna is too high.

* * * * *